United States Patent Office 3,405,913
Patented Oct. 15, 1968

3,405,913
ROTARY SEAL STRUCTURE
Victor G. Chatfield, La Salle, Quebec, and Peter G. Roper, Westmount, Quebec, Canada, assignors to Dominion Engineering Works, Limited, Lachine, Quebec, Canada, a corporation of Canada
Continuation of application Ser. No. 644,879, June 9, 1967, which is a continuation of application Ser. No. 326,608, Nov. 27, 1963. This application Dec. 4, 1967, Ser. No. 687,903
3 Claims. (Cl. 253—26)

ABSTRACT OF THE DISCLOSURE

To seal an annular aeration space of an aerated turbo machine such as the crown space of a Francis turbine against loss of aerating fluid from the radially inner zone of the aeration space, there is provided a leakage path extending radially outwardly relative to the runner main axis, bounded by an annulus filled with pressurized sealing liquid, and a rotary annular surface of the gland structure contacting the sealing liquid in sealing and circulatory pumping relation therewith.

---

Figure 1:
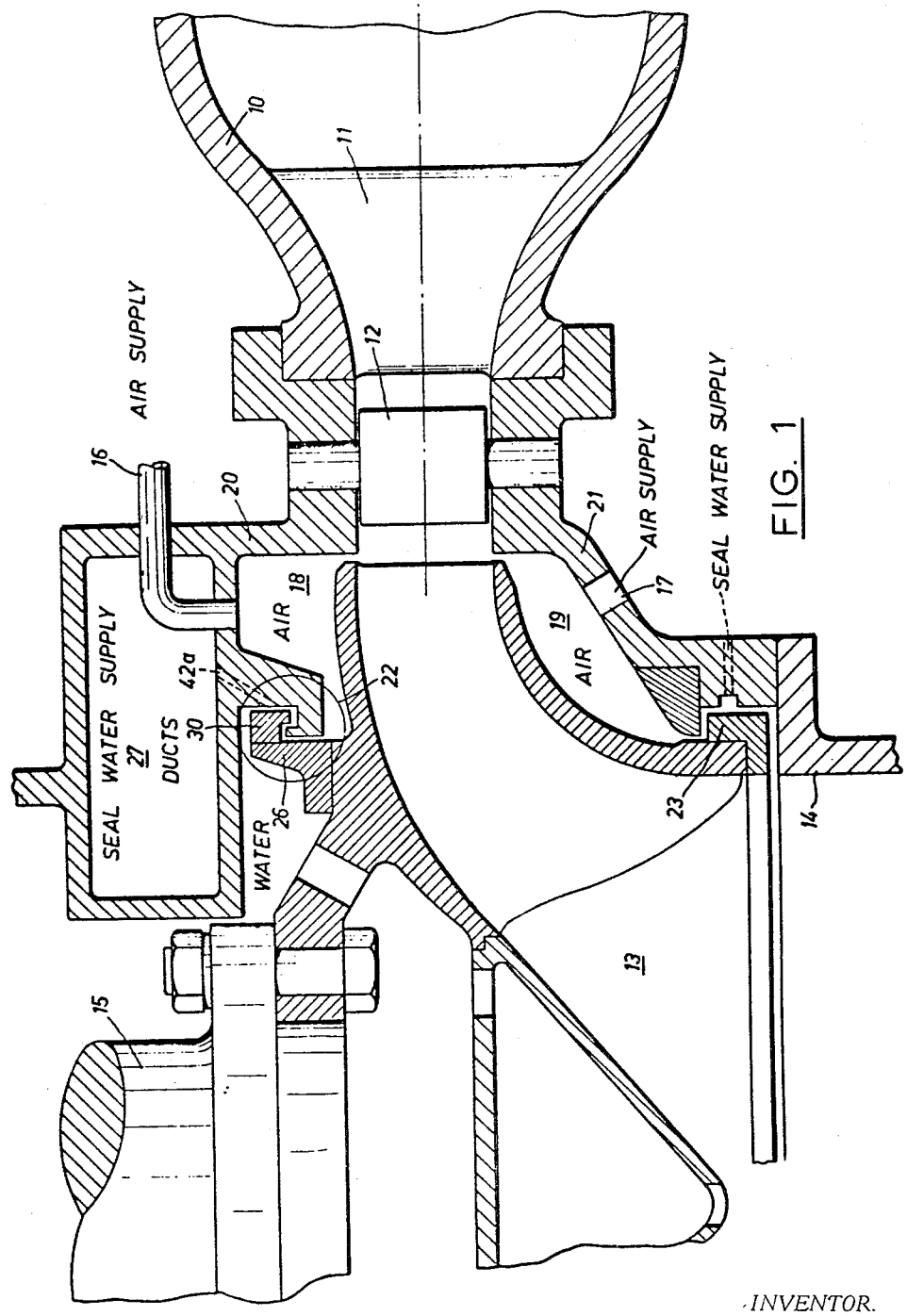

This application is a continuation of application Ser. No. 644,879, filed June 9, 1967 (now abandoned), which was a continuation of abandoned application Ser. No. 326,608, filed Nov. 27, 1963. This invention relates to hydraulic machines of the rotary type, such as, mixed-flow pumps, hydraulic turbines and pump-turbines of the Francis type, which include a shrouded rotor and in which means are provided for maintaining the spaces between the outside of the shrouds and the adjacent static structure filled with fluid of lower density and also lower absolute viscosity than the working fluid, and has particular reference to the provision of new and improved means for preventing the escape of this fluid from the shroud spaces.

In U.S. Patent No. 3,174,720, of Mar. 23, 1965, there is shown an arrangement for providing a rotary turbo machine of the aerated type with means for sealing the aerated shroud spaces, to prevent the loss of air or other low drag fluid from the aerated shroud spaces.

In the operation of such aerated machines, the potential gain of efficiency made possible by machine aeration does not exceed more than one or two percent of the machine output, so that conservation of the aeration fluid is of considerable significance in the effective operation of such machines. It has been found that aeration crown space seal arrangements such as shown in U.S. Patent No. 3,174,719, being of the coaxial semi-labyrinth type require the maintenance of very close radial seal clearances, and are sensitive to changes in location or orientation while the loss due to drag in this type of seal is undesirable.

Prior seal arrangements, such as U.S. Patent No. 2,834,618, dated May 1958 to Wiltse and U.S. Patent No. 773,297 dated October 1904 to Nash, rely on the use of dense sealing liquids, such as mercury to provide a high centrifugal pressure in the sealing zone, but such seals are not suited to the working conditions encountered in turbo hydraulic machines of the type to which the present invention is directed.

Other prior seal arrangements include German Patent No. 867,933, July 8, 1949; U.S. Patent Nos. 3,174,720, Mar. 23, 1965, to Sproule and 3,239,193 of Mar. 8, 1966, to Kerensky. The German structure relies on the use of a sealing disc having auxiliary buckets attached thereto; Sproule is directed to seal arrangements for use with a skirt shroud, while the Kerensky crown shroud sealing arrangement shows an air seal having a gas flow passage extending radially inwardly relative to the liquid containing seal zone, and thus permits mixing of air with the sealing water.

For clarity of description the fluid of less density and less absolute viscosity mentioned above shall hereafter be referred to as air and the working fluid as water, although it is understood that these fluids could be any that provide the necessary physical properties.

It is an object of the present invention to provide a new and improved seal of the type set forth which effectively prevents the escape of the fluid of lower density and viscosity, such as air, from the shroud spaces of the rotary hydraulic machine without requiring impracticably small running clearances.

Another object of the present invention is to provide a new and improved crown seal of the type set forth which limits the escape of air from the crown shroud spaces of the rotary hydraulic machine by means of centrifugal separation of air and the sealing liquid utilised in the rotary hydraulic machine. Further the seal will be considered as a crown seal in the head cover of a turbine although it is also understood that other locations, such as on each side of the runner of horizontal shaft machine, is also included in this invention.

The present invention thus provides in a hydraulic turbo machine having a bladed runner rotatably mounted within a stationary housing, having a headcover attached thereto, a crown shroud attached to the blades of the runner forming an aeration space between the headcover and the facing surface of the shroud, the improvement comprising an annular seal bounding the radially inner portion of the aeration space to limit the loss of aeration gas therefrom, including a fixed annular pocket extending from the headcover substantially concentric with the runner main axis having an upstanding inner lip portion to contain sealing liquid; an annular outward extension of the runner in radial overlapping relation with a portion of the pocket; facing surfaces of the runner extension and the pocket forming a first passage extending outwardly relative to the runner main axis from the inner end of the aeration space to the pocket in gas conducting relation therewith; a second passage connecting the pocket to a drain; and liquid supply means connected with the pocket to supply sealing liquid thereto to maintain the pressure of sealing liquid in the pocket equal to the gas pressure in the aeration space and to provide in operation a gas to liquid seal interface within the pocket extending between an axial end face of the runner extension and the pocket, the end face serving to energise the liquid within the pocket to produce substantially toroidal circulation thereof relative to the pocket whereby maintenance of the liquid interface and separation of gas therefrom is promoted.

Other objects and advantages of the invention will be apparent from the following description taken in connection with the accompanying drawings; and it will be understood that changes may be made in the details of construction and arrangement of parts shown and described as the preferred form of the invention has been given by way of illustration only.

Figure 2:
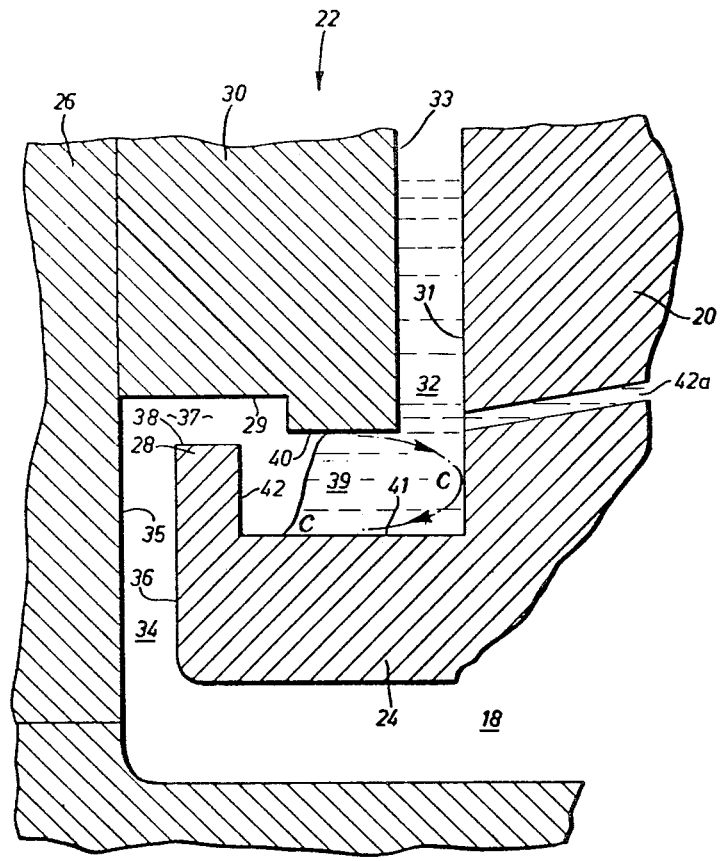

Referring to the drawings:

FIG. 1 is a fragmentary diametral sectional view of a Francis machine, of the turbine, pump, or pump-turbine type embodying the invention; and FIG. 2 is an enlarged sectional view illustrating the portion of FIG. 1 shown encircled.

Referring more particularly to the drawings wherein similar reference characters designate corresponding parts throughout the several views, and with particular reference to FIG. 1, when the Francis type hydraulic machine illustrated therein operates as a turbine, water from the inlet casing 10 is directed by the stay vanes 11 and the wicket gates 12 to the rotor, which is shown generally at 13 and is discharged by way of the draft tube 14. The rotor 13 is attached to a shaft 15 which is journalled in a suitable guide bearing (not shown).

When applied to a pump, the rotor 13 and the shaft 15 are rotated by means of external power applied to the shaft 15; and the flow of working fluid, generally water, is in the reverse direction.

It has been found to be desirable, in machines of this type, to introduce a fluid of lower density and lower absolute viscosity, than the working fluid, by means of pipes 16 and 17 into the crown and band shroud spaces, shown generally at 18 and 19, respectively. In general hydraulic practice this introduced fluid is normally air, and the working fluid is water.

The crown shroud space 18 is located between the rotor 13 and the head cover 20; while the band shroud space 19 is located between said runner 13 and the lower cover 21. On a horizontal shaft machine the head cover and lower cover would be called crown cover and band cover respectively.

It is believed that, due to the rotation imparted by the rotor 13, the seal water is centrifugally separated from the air in the spaces 18 and 19, thus, leaving the spaces filled with air. The air, when conventional seals are utilized, escapes radially inwardly past the seals.

Band seal 23 comprises a seal that is substantially similar to that disclosed in United States Patent 3,174,719. We have found that when the band seal is inverted for use in the crown shroud space, the seal is not as effectice as in the band and it is, therefore, intended to describe in detail the construction and operation of an improved configuration for the crown seal 22.

Referring to FIG. 2 of the drawings, such is an enlarged view of that portion 22 of FIG. 1 shown encircled and illustrates, in detail, the essential features of the preferred execution of the invention as such is applied to the crown seal which is shown generally at 22 in FIG. 1.

With more particular reference to FIG. 2, this illustrates a rotary seal ring 30 which is rigidly attached to the rotor crown 26 and is, further, located within the bore 31 of the head cover 20. The annular space 32 is the radial clearance between the periphery 33 of the seal ring 30 and the bore 31.

The annular space 34 is of lesser diameter than the annular space 32 and is the radial clearance between the periphery 35 of the crown 26 and the bore 36 of the lip 28.

Annular space 37 is bounded by the horizontal face 38 of the lip 28 and the horizontal face of the groove 29 and connects the annular space 34 with the annular space 39. The annular space 39 is bounded by the radial face 40 of seal ring 30 and the radial face 41 of head cover extension 24.

The spaces 32, 39, 37, and 34 need not be of the configuration shown but, rather, may be of any suitable shape that produces the flow action described.

A specific example of the action of the foredescribed seal is as follows. Sealing water 27 is supplied at a pressure greater than the air pressure in the crown shroud space 18 by means of ducts 42a from an external source and is directed into the annular space 32. When the pressure of the sealing water 27 is equal to the air pressure in the space 18 plus not more than the pumping head produced by the rotation of the fluid imparted by the rotative radial face 40 of seal ring 30, a stable condition exists which effectively fills a portion of the space 39 to establish an air/water interface and prevents air in the space 18 from leaking past the space 39.

This is believed to be accomplished in the following manner:

With the sealing water filling a portion of the space 39, the action of the rotating radial face 40 impresses a force on the water urging it in the radially outward direction toward stationary surface 31 of the head cover. This centrifugal pumping action causes a pressure differential across the space 39 with the higher pressure against surface 31, thus a flow is induced in the direction of the heavy arrows c—c inwardly along stationary surface 41 and up the interface, where it again comes under the influence of the rotating surface 40 to complete the cycle. It will be understood that although FIGURE 2 and the foregoing description refer only to two-dimensional flow, in actual practice a multi-dimensional or toroidal flow will exist. This description, however, describes the essential part of the flow pattern which produces the standing water seal in the area adjacent to spaces 37 and 39.

The high centrifugal forces acting on the sealing liquid due to the toroidal circulation thereof tends to separate any gas content of the sealing water, to improve the efficiency of sealing and reduce the quantity of gas lost by entrainment with the sealing liquid.

What we claim as new and desire to secure by Letters Patent of the United States is:

1. In a hydraulic turbo machine having a bladed runner rotatably mounted within a stationary housing, having a headcover attached thereto, a crown shroud attached to the blades of the runner forming an aeration space between said headcover and the facing surface of said shroud, the improvement comprising an annular seal bounding the radially inner portion of said aeration space to limit the loss of aeration gas therefrom, including a fixed annular pocket extending from said headcover substantially concentric with the runner main axis having an upstanding inner lip portion to contain sealing liquid; an annular outward extension of said runner in radial overlapping relation with a portion of said pocket; facing surfaces of said runner extension and said pocket forming a first passage extending outwardly relative to the runner main axis from the inner end of said aeration space to said pocket in gas conducting relation therewith; a second passage connecting said pocket to drain; and liquid supply means connected with said pocket to supply sealing liquid thereto to maintain the pressure of sealing liquid in said pocket equal to the gas pressure in the aeration space and to provide in operation a gas to liquid seal interface within the pocket extending between an axial end face of said runner extension and said pocket, said end face serving to energise the liquid within said pocket to produce substantially toroidal circulation thereof relative to said pocket whereby maintenance of said liquid interface and separation of gas therefrom is promoted.

2. A hydraulic turbo machine as claimed in claim 1 in which said sealing liquid supply means includes a water supply conduit connected with said passage intermediate said pocket and said drain.

3. A hydraulic turbo machine as claimed in claim 1 in which said gas is air and said sealing liquid is water.

References Cited

UNITED STATES PATENTS

| 2,834,618 | 5/1958 | Wiltse. | |
| 3,174,719 | 3/1965 | Sproule et al. | 253—26 |
| 3,174,720 | 3/1965 | Sproule | 253—26 |
| 3,239,193 | 3/1966 | Kerensky | 253—26 |

FOREIGN PATENTS

| 867,933 | 3/1953 | Germany. |

EVERETTE A. POWELL, JR., *Primary Examiner.*